United States Patent [19]

Takeo

[11] Patent Number: 5,278,755
[45] Date of Patent: Jan. 11, 1994

[54] METHOD FOR DETERMINING IMAGE POINTS IN OBJECT IMAGES USING NEURAL NETWORKS

[75] Inventor: Hideya Takeo, Kanagawa, Japan

[73] Assignee: Fuji Photo Film Co., Ltd., Kanagawa, Japan

[21] Appl. No.: 829,772

[22] Filed: Jan. 31, 1992

[30] Foreign Application Priority Data

Mar. 7, 1991 [JP] Japan ................................. 3-041782

[51] Int. Cl.$^5$ ............................................. G06F 15/00
[52] U.S. Cl. .......................... 364/413.13; 364/413.22; 250/484.2
[58] Field of Search ....................... 364/413.13, 413.17, 364/274.9; 250/484.1, 327.2; 395/20, 21

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,387,428 | 6/1983 | Ishida et al. | 364/413.13 |
| 4,527,060 | 7/1985 | Suzuki et al. | 250/327.2 |
| 4,682,028 | 7/1987 | Tanaka et al. | 250/327.2 |
| 4,967,079 | 10/1990 | Shimura | 250/327.2 |
| 5,179,597 | 1/1993 | Takeo | 382/41 |

FOREIGN PATENT DOCUMENTS 61-5193  2/1986 .
56-11395 2/1981 Japan .

OTHER PUBLICATIONS

D. E. RumelHart et al., "Learning Internal Representations by error propagation In Parallel Distributed Processing", 1986, 319-362.

Primary Examiner—Roy N. Envall, Jr.
Assistant Examiner—Khai Tran
Attorney, Agent, or Firm—Sughrue, Mion, Zinn, Macpeak & Seas

[57] ABSTRACT

An image point located in the region inside of an object image is determined from an image signal made up of a series of image signal components representing respective picture elements in a radiation image, which includes the object image and which has been recorded on a recording medium in accordance with a predetermined image recording menu. A plurality of different neural networks are prepared for a plurality of different image recording menus. Each of the neural networks receives an image signal and generates outputs which represent an image point. A neural network, which is optimum for the predetermined image recording menu, is selected from the plurality of the neural networks. Outputs, which represent the image point located in the region inside of the object image, are then obtained from the selected neural network.

8 Claims, 4 Drawing Sheets

METHOD FOR DETERMINING IMAGE POINTS IN OBJECT IMAGES USING NEURAL NETWORKS

BACKGROUND OF THE INVENTION

1. Field of the Invention

This invention relates to a method for determining an image point in an object image from an image signal made up of a series of image signal components representing picture elements in a radiation image, which has been recorded on a recording medium and which includes the object image therein.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a copy photograph, or the like. In this manner, a visible image having good image quality with high contrast, high sharpness, high graininess, or the like can be reproduced.

Also, when certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In order for an image signal to be detected accurately, certain factors which affect the image signal must be set in accordance with the dose of radiation delivered to the stimulable phosphor sheet and the like. Novel radiation image recording and reproducing systems which accurately detect an image signal have been proposed in, for example, U.S. Pat. No. 4,527,060. The proposed radiation image recording and reproducing systems are constituted such that a preliminary read-out operation (hereinafter simply referred to as the "preliminary readout") is carried out in order approximately to ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having an energy level higher than the energy level of the light beam used in the preliminary readout, and the radiation image is read out with the factors affecting the image signal adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary readout is or is not carried out, it has also been proposed to analyze the image signal (including the preliminary read-out image signal) obtained and to adjust the image processing conditions, which are to be used when the image signal is processed, on the basis of the results of an analysis of the image signal. The term "image processing conditions" as used herein means a group of various factors, which are adjustable and set when an image signal is subjected to processing, which affect the gradation, sensitivity, or the like, of a visible image reproduced from the image signal. The proposed method is applicable to cases where an image signal is obtained from a radiation image recorded on a recording medium such as conventional X-ray film, as well as to systems using stimulable phosphor sheets.

Various methods have been proposed for calculating how the read-out conditions for the final readout and/or the image processing conditions should be adjusted on the basis of an analysis of the image signal (including the preliminary read-out image signal). As one of such methods, it has been proposed in, for example, U.S. Pat. No. 4,682,028 to create a histogram of the image signal. When a histogram of an image signal is created, the characteristics of the corresponding radiation image recorded on a recording medium, such as a stimulable phosphor sheet or X-ray film, can be ascertained based on, for example, the maximum value of the image signal, the minimum value of the image signal, or the value of the image signal at which the histogram is maximum, i.e. the value which occurs most frequently. Therefore, if the read-out conditions for the final readout, such as the read-out gain or the scale factor, and/or the image processing conditions are based on an analysis of the histogram of the image signal, it becomes possible to reproduce a visible radiation image which has good image quality and can serve as an effective tool in, particularly, the efficient and accurate diagnosis of an illness.

Also, in the course of recording a radiation image, it is often desirable for portions of the object not related to a diagnosis or the like to be prevented from being exposed to radiation. Further, when the object portions not related to a diagnosis or the like are exposed to radiation, the radiation is scattered by such portions to the portion that is related to a diagnosis or the like, and the image quality is adversely affected by the scattered radiation. Therefore, when a radiation image is recorded on the recording medium, an irradiation field stop is often used to limit the irradiation field to an area smaller than the overall recording region of the recording medium so that radiation is irradiated only to that portion of the object, which is to be viewed, and part of the recording medium.

However, in cases where the read-out conditions for the final readout and/or the image processing conditions are calculated on the basis of the results of an analysis of the image signal in the manner described above and the image signal is detected from a recording medium, on which the irradiation field was limited during the recording of the radiation image, the radiation image cannot be ascertained accurately if the image signal is analyzed without the shape and location of the irradiation field being taken into consideration. As a result, incorrect read-out conditions and/or an incorrect image processing conditions are set, and it becomes impossible to reproduce a visible radiation image which has good image quality and can serve as an effective tool in, particularly, the efficient and accurate diagnosis of an illness.

In order to eliminate the aforesaid problem, it is necessary to determine the shape and location of an irradiation field and then to calculate the read-out conditions for the final readout and/or the image processing conditions on the basis of only the image signal representing image information stored in the region inside of the irradiation field.

Accordingly, the applicant has proposed in, for example, U.S. Pat. No. 4,967,079 a novel method for accurately determining the shape and location of an irradiation field even when the irradiation field has an irregular shape. The proposed method comprises the steps of detecting a contour point, which is considered to be present on the contour of the irradiation field, on each of a plurality of radial lines each of which connects a predetermined point located in the region inside of the irradiation field with an edge of a recording medium, and determining that the region surrounded by lines connecting the thus detected contour points is the irradiation field.

In the proposed method for determining the shape and location of an irradiation field, the aforesaid predetermined point should be located in the region inside of the irradiation field, and should preferably be located in an object image, which is formed in the region inside of the irradiation field. In cases where the recording of a radiation image is carried out with an irradiation field stop, since the irradiation field stop is used to limit the irradiation field so that an image of only that portion of the object which is to be viewed is recorded, the image points in the region inside of the irradiation field (particularly, the image points at positions neighboring the center point of the irradiation field) are generally located in the region inside of the object image.

In cases where the shape and location of the irradiation field are first determined and then the image signal representing the image information recorded in the region inside of the detected irradiation field is analyzed in the manner as that described above, appropriate read-out conditions for the final readout and/or appropriate image processing conditions can be determined.

However, in order to determine the shape and location of an irradiation field with the method proposed in U.S. Pat. No. 4,967,079, it is necessary to find an image point located in the region inside of the irradiation field (preferably, an image point located in the region inside of the object image).

The image point located in the region inside of the object image should be determined when the shape and location of the irradiation field are to be recognized as described above, and when which position on a radiation image is to be employed as the center point of a visible image is determined in cases where, for example, part of the radiation image is enlarged and reproduced into the visible image.

Various methods for determining an image point in an object image have been proposed. Two examples of such methods are disclosed in U.S. patent application Ser. No. 340,744. One of the disclosed methods comprises the steps of:
  i) on the basis of an image signal made up of a series of image signal components representing respective picture elements in a radiation image, which includes an object image and which has been recorded on a recording medium, finding the center of gravity on the recording medium by weighting the respective picture elements with image signal values corresponding to the respective picture elements or with the reciprocals of the image signal values, and
  ii) determining a position, at which the center of gravity is located, as the image point in the object image.

The other disclosed method comprises the steps of:
  i) on the basis of an image signal made up of a series of image signal components representing respective picture elements in a radiation image, which includes an object image and which has been recorded on a recording medium, arraying image signal values corresponding to the respective picture elements or the reciprocals of the image signal values such that the positions of the image signal values or the positions of the reciprocals of the image signal values coincide with the positions of the corresponding picture elements,
  ii) cumulating the image signal values or the reciprocals of the image signal values along each of two different directions on the recording medium, and plotting the resulting cumulative values of the image signal values or the resulting cumulative values of the reciprocals of the image signal values along each of the two different directions, thereby to find the distributions of the cumulative values along the two different directions,
  iii) detecting a coordinate point along each of the two different directions, for which point the cumulative value is approximately one half of the maximum cumulative value, from each of the distributions of the cumulative values, and
  iv) determining a position on the recording medium, which position is defined by the coordinate points detected along the two different directions, as the image point in the object image.

Recently, a method for utilizing a neural network has been proposed. It is considered that the method for utilizing a neural network may be applied when an image point in an object image is to be determined.

The neural network is provided with a learning function by a back propagation method. Specifically, when information (an instructor signal), which represents whether an output signal obtained when an input signal is given is or is not correct, is fed into the neural network, the weight of connections between units in the neural network (i.e. the weight of synapse connections) is corrected. By repeating the learning operation of the neural network, the probability that a correct answer will be obtained in response to a new input signal can be kept high.

By utilizing the neural network, an image point in an object image can be determined from an image signal representing a radiation image, in which the object image is included.

Specifically, an image signal representing a radiation image is fed into the neural network. From the neural network, outputs representing an image point are obtained. By repeating the learning operation of the neural network, outputs more accurately representing the image point can be obtained.

The methods disclosed in U.S. patent application Ser. No. 340,744 filed Apr. 20, 1989, now U.S. Pat. No. 5,179,597 which do not depend on an image recording menu. Specifically, with the disclosed methods, even if the image recording menu changes, determination of an image point in an object image is carried out in the same mode. However, if the image recording menu changes, the values of the image signal change. Therefore, the problem occurs in that an image point in an object image cannot be determined accurately for a certain image recording menu.

Specifically, a certain method for determining an image point in an object image is suitable only for a certain image recording menu. Therefore, for an image recording menu, a method for determining an image point in an object image, which method is optimum for the image recording menu, must be selected.

For example, when a radiation image of the head of a human body is recorded on a recording medium, a circular irradiation field stop is often used. Therefore, for a radiation image of the head of a human body, an image point must be determined, from which the shape and location of an irradiation field having one of various irregular shapes (including a circular shape) can be determined. Also, when a tomographic radiation image is recorded, the edge of an irradiation field often becomes unsharp due to flow of the image. Therefore, in such cases, an image point must be determined such that the shape and location of the irradiation field can be determined even if the edge of the irradiation field is unsharp.

SUMMARY OF THE INVENTION

The primary object of the present invention is to provide a method for determining an image point in an object image, wherein neural networks are utilized, and an image point located in the region inside of an object image is determined accurately.

Another object of the present invention is to provide a method for determining an image point in an object image wherein, even if a radiation image recording menu changes, an image point located in the region inside of an object image can be determined, which image point is optimum for the new radiation image recording menu.

The present invention provides a method for determining an image point in an object image, wherein an image point located in the region inside of an object image is determined from an image signal made up of a series of image signal components representing respective picture elements in a radiation image, which includes the object image and which has been recorded on a recording medium (such as a stimulable phosphor sheet or X-ray film) in accordance with a predetermined image recording menu, the method for determining an image point in an object image comprising the steps of:
  i) preparing a plurality of different neural networks for a plurality of different image recording menus, each of said neural networks receiving an image signal and generating outputs which represent an image point,
  ii) selecting a neural network, which is optimum for said predetermined image recording menu, from the plurality of said neural networks, and iii) obtaining outputs, which represent said image point located in the region inside of said object image, from the selected neural network.

Each of the plurality of image recording menus includes, for example, what mode is used when the image is recorded (e.g., an ordinary image recording mode, an enlarged image recording mode, or a tomographic image recording mode), what portion of an object is represented by the recorded image (e.g., the head, the neck, the chest, or the abdomen in cases where the object is a human body), and what image recording apparatus is used when the image is recorded.

Also, in the method for determining an image point in an object image in accordance with the present invention, a neural network, which is optimum for the predetermined image recording menu, is selected from the plurality of the neural networks. The neural network, which is optimum for the predetermined image recording menu, may be selected automatically. In many cases, the image recording menu which was used during the recording of a radiation image is already known. Therefore, alternatively, the neural network, which is optimum for the predetermined image recording menu, may be selected manually.

With the method for determining an image point in an object image in accordance with the present invention, a plurality of different neural networks are prepared for a plurality of different image recording menus. Each of the neural networks receives an image signal and generates outputs which represent an image point. A neural network, which is optimum for the predetermined image recording menu, is selected from the plurality of the neural networks. The selected neural network is employed in obtaining outputs, which represent the image point located in the region inside of the object image. Therefore, even if the image recording menu changes, an image point located in the region inside of an object image can be determined, which image point is optimum for the new radiation image recording menu.

DESCRIPTION OF THE PREFERRED EMBODIMENTS

The present invention will hereinbelow be described in further detail with reference to the accompanying drawings.

Figure 1:
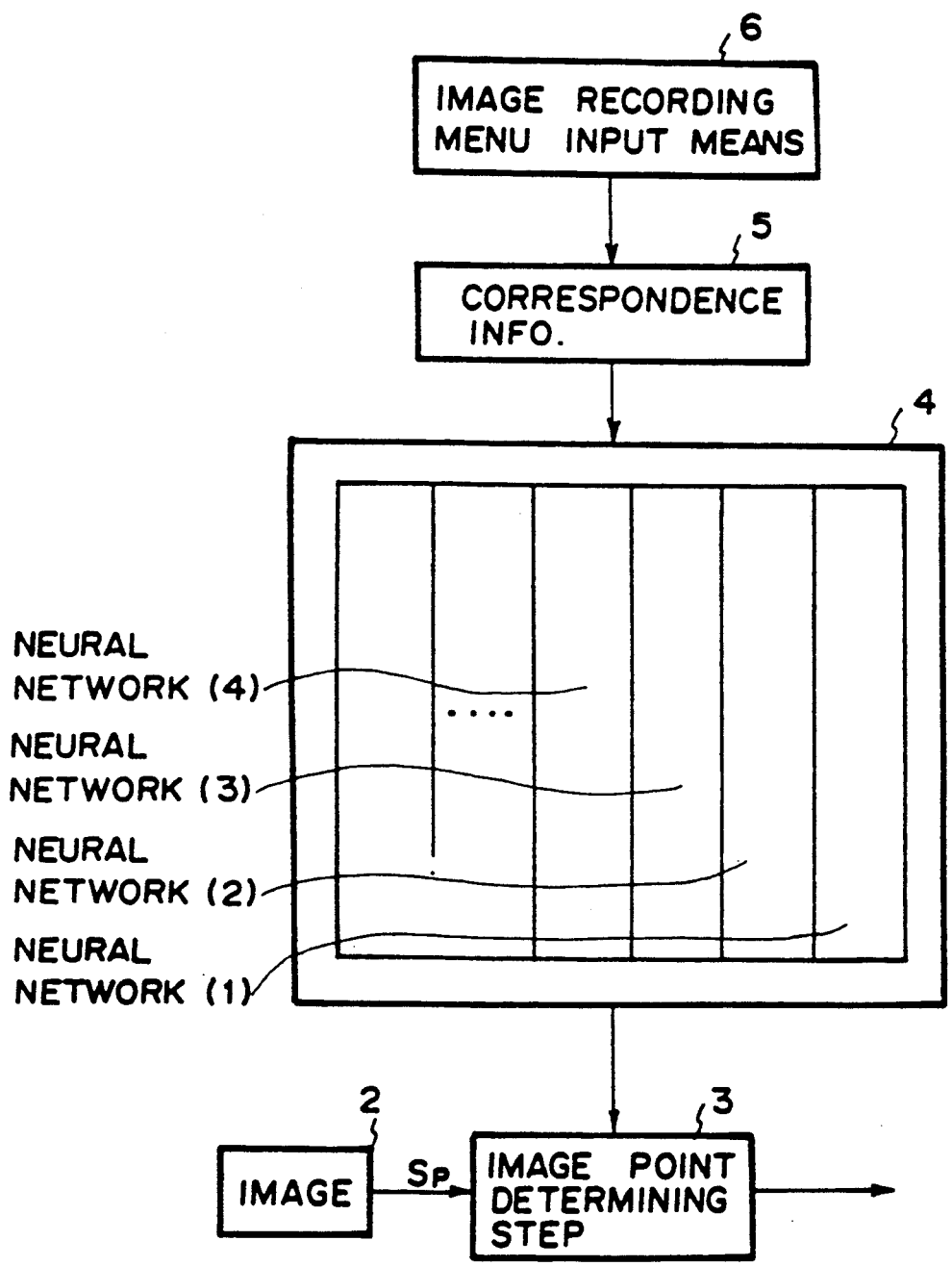
FIG. 1 is a block diagram showing an embodiment of the method for determining an image point in an object image in accordance with the present invention.

FIG. 1 is a block diagram showing an embodiment of the method for determining an image point in an object image in accordance with the present invention.

With reference to FIG. 1, in a step 2, a radiation image of an object is read out from a recording medium, on which the radiation image has been recorded with an irradiation field stop. In this manner, an image signal SP representing the radiation image is obtained. In an image point determining step 3, an image point located in the radiation image including an object image, which radiation image has been recorded on the recording medium, is determined from the image signal SP. During the determination of the image point, a neural network is selected and utilized, which neural network is optimum for the determination of the image point. In order for an optimum neural network to be selected, pieces of information about a plurality of different neural networks (1), (2), (3), . . . are stored in a memory 4. From the plurality of the different neural networks (1), (2), (3), . . . , an optimum neural network is selected in accordance with an image recording menu (i.e. in accordance with what mode is used when the image is recorded, what portion of an object is represented by the recorded image, and/or what image recording apparatus is used when the image is recorded). For this purpose, information about the image recording menu is entered from an image recording menu input means 6. The information about the image recording menu is then fed from the image recording menu input means 6 into a memory 5. The memory 5 stores correspondence information representing which neural network stored in the memory 4 is suitable for which image recording menu. In accordance with the information about the image recording menu, which information has been entered from the image recording menu input means 6, a neural network suitable for the image recording menu is selected with reference to the correspondence information stored in the memory 5. The image signal SP is fed into the neural network, which has thus been selected, and an image point located in the region inside of the object image is determined with the neural network.

For example, in cases where an image of the head is recorded on a recording medium, the shape of the irradiation field on the recording medium is usually circular. Therefore, when the information representing that a head image was recorded is entered from the image recording menu input means 6, a neural network is selected which is suitable for determining an image point located in an irradiation field having an irregular shape (including a circular shape). When the information representing that an image was recorded in a tomographic mode is entered from the image recording menu input means 6, a neural network is selected which is suitable for determining an image point such that, even if the edge of an irradiation field is unsharp due to flow of the image, the shape and location of the irradiation field can be determined accurately.

An example of a radiation image read-out and reproducing apparatus, which utilizes a computer system wherein the embodiment of the method for determining an image point in an object image in accordance with the present invention is employed, will be described hereinbelow.

Figure 2:
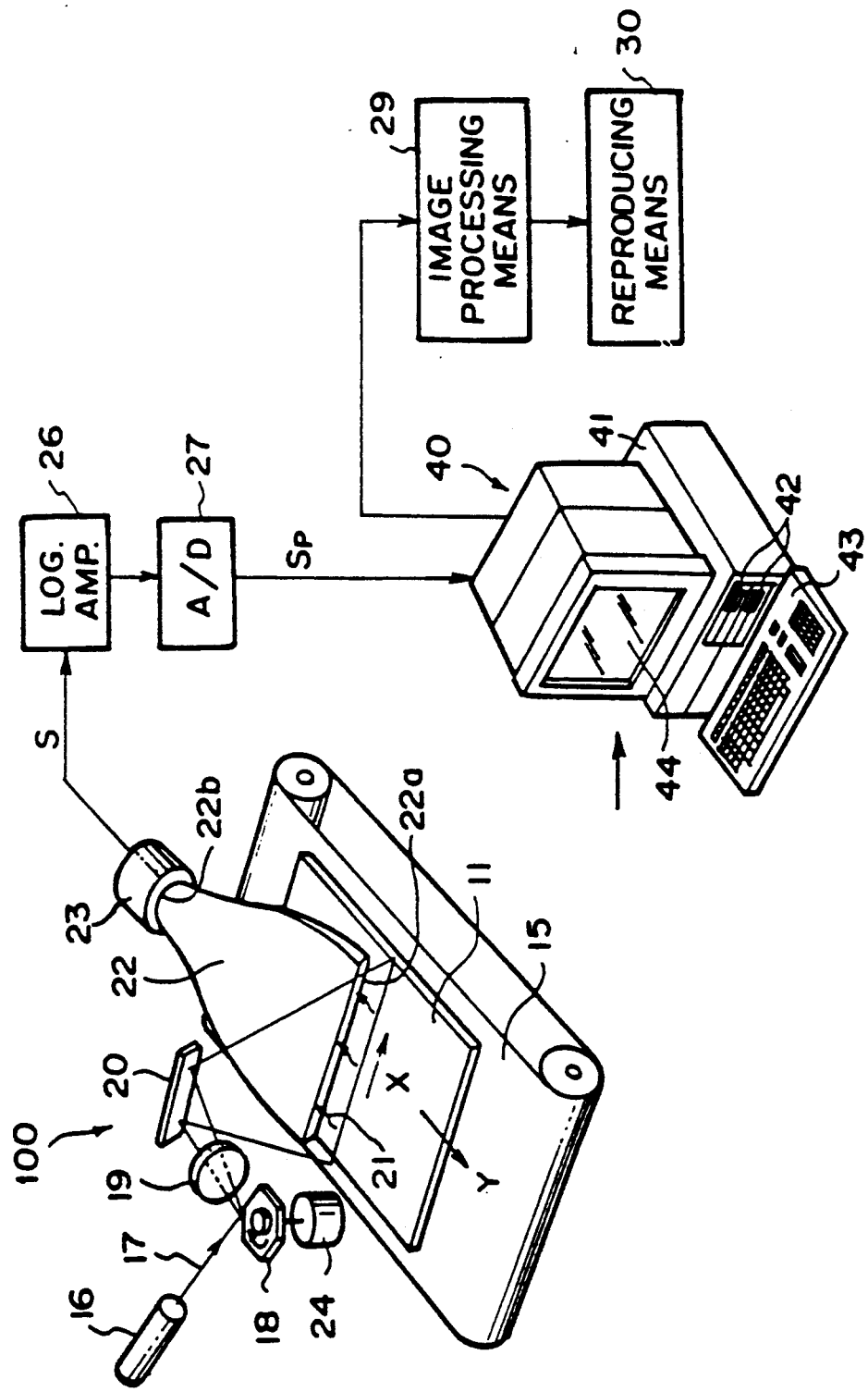
FIG. 2 is a perspective view showing an example of a radiation image read-out and reproducing apparatus, wherein the embodiment of the method for determining an image point in an object image in accordance with the present invention is employed.

FIG. 2 is a perspective view showing an example of a radiation image read-out and reproducing apparatus and an example of a computer system, wherein the embodiment of the method for determining an image point in an object image in accordance with the present invention is employed. In the radiation image read-out and reproducing apparatus, a stimulable phosphor sheet is utilized.

A stimulable phosphor sheet 11, on which a radiation image has been stored, is placed at a predetermined position in a read-out means 100. The stimulable phosphor sheet 11 is conveyed in a sub-scanning direction, which is indicated by the arrow Y, by a sheet conveyance means 15. The sheet conveyance means 15 is constituted of an endless belt, or the like, and is operated by an operating means (not shown). A laser beam 17 is produced by a laser beam source 16. The laser beam 17 is reflected and deflected by a rotating polygon mirror 18, which is being quickly rotated by a motor 24 in the direction indicated by the arrow. The laser beam 17 then passes through a converging lens 19, which is constituted of an fθ lens, or the like. The direction of the optical path of the laser beam 17 is then changed by a mirror 20, and the laser beam 17 is caused to impinge upon the stimulable phosphor sheet 11 and scan it in a main scanning direction indicated by the arrow X. The main scanning direction is approximately normal to the sub-scanning direction indicated by the arrow Y. When the stimulable phosphor sheet 11 is exposed to the laser beam 17, the exposed portion of the stimulable phosphor sheet 11 emits light 21 in an amount proportional to the amount of energy stored thereon during its exposure to radiation. The emitted light 21 is guided by a light guide member 22, and photoelectrically detected by a photomultiplier 23. The light guide member 22 is made from a light guiding material, such as an acrylic plate. The light guide member 22 has a linear light input face 22a, positioned to extend along the main scanning line on the stimulable phosphor sheet 11, and a ring-shaped light output face 22b, positioned so that it is in close contact with a light receiving face of the photomultiplier 23. The emitted light 21, which has entered the light guide member 22 from its light input face 22a, is guided through repeated total reflection inside of the light guide member 22, emanates from the light output face 22b, and is received by the photomultiplier 23. In this manner, the amount of the emitted light 21, which amount represents the radiation image, is converted into an electric signal by the photomultiplier 23.

An analog output signal S generated by the photomultiplier 23 is logarithmically amplified by a logarithmic amplifier 26, and digitized by an A/D converter 27 into an image signal SP which is made up of a series of image signal components representing the picture elements of the radiation image.

The image signal SP thus obtained is fed into a computer system 40. The computer system 40 employs the embodiment of the method for determining an image point in an object image in accordance with the present invention. The computer system 40 comprises a main body 41 in which a CPU and an internal memory are incorporated, a disk drive unit 42 which operates a floppy disk serving as a subsidiary memory, a keyboard 43 from which necessary instructions, or the like, are fed into the computer system 40, and a CRT display device 44 which displays necessary information.

The memory of the computer system 40 stores pieces of information representing a plurality of different neural networks. Also, a different memory stores correspondence information representing which neural network is suitable for which image recording menu.

When an image point located in the region inside of the object image is to be determined, the correspondence information is referred to in accordance with the information representing the image recording menu, which information is entered from the keyboard 43. A neural network, which is optimum for the designated image recording menu, is selected from the plurality of the different neural networks. Thereafter, the image signal SP is fed into the selected neural network, and an image point located in the region inside of the object image is determined by the selected neural network.

How the learning operation of a neural network is repeated and an image point is accurately determined by the neural network will be described hereinbelow.

Figure 3:
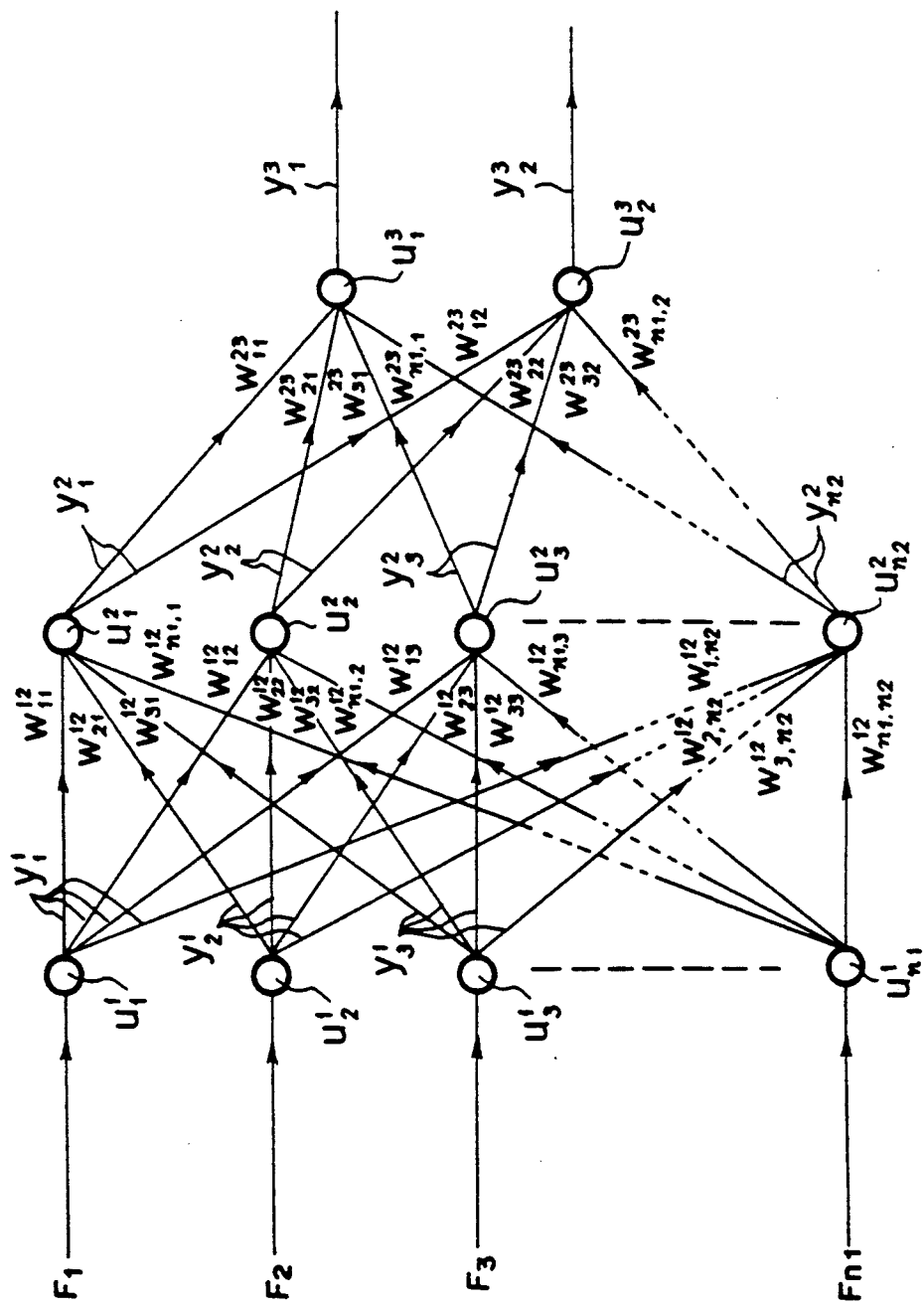
FIG. 3 is an explanatory view showing an example of a neural network which is employed in a means for determining an image point in an object image.

FIG. 3 is an explanatory view showing an example of the neural network which is provided with a learning function by a back propagation method. The learning function by a back propagation method is a well known learning method for imparting a neural network with a predetermined function. Specifically, the term "learning function by a back propagation method" as used herein means the learning algorithms in a neural network, with which the output of the neural network is compared with a correct answer (an instructor signal), and the weights of connections (i.e. the weights of synapse connections) are corrected sequentially from the output side to the input side of the neural network.

Figure 4:
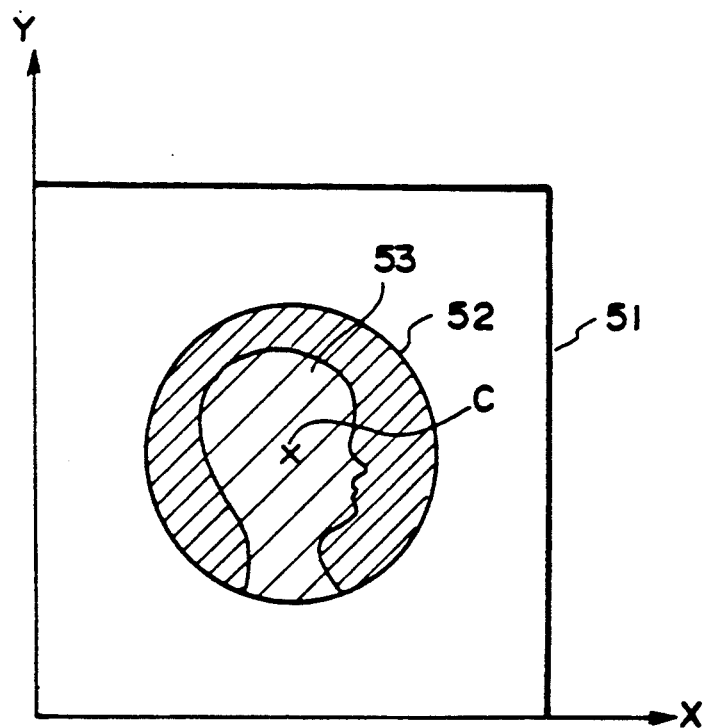
FIG. 4 is an explanatory view showing an example of a radiation image recorded on a recording medium.

With reference to FIG. 3, the neural network comprises a first layer (an input layer), a second layer (an intermediate layer), and a third layer (an output layer). The first, second, and third layers are composed respectively of n1 number of units, n2 number of units, and two units. Signals F1, F2, ..., Fn1 fed into the first layer (the input layer) are the image signal components of the image signal SP representing the picture elements in the radiation image. Two outputs $y_1^3$ and $y_2^3$ obtained from the third layer (the output layer) are the signals representing the x coordinate and the y coordinate of an image point C in the x-y rectangular coordinate system on the stimulable phosphor sheet 11 shown in FIG. 4. An i'th unit of a k'th layer is indicated by $u_i^k$. The total input into the unit $u_i^k$ is indicated by $x_i^k$, and the total output therefrom is indicated by $y_i^k$. The weight of connection from the unit $u_i^k$ to a unit $u_j^{k+1}$ is indicated by $W_{ij}^{k+1}$. Also, each unit $u_j^k$ has the same characteristic function, which is expressed as $$f(x) = \frac{1}{1 - e^x} \quad (1)$$

The input $x_j^k$ into each unit $u_j^k$ and the output $y_j^k$ therefrom are expressed as $$x_j^k = \sum_i W_i^{k-1}{}_{kj} \cdot y_i^{k-1} \quad (2)$$

$$y_j^k = f(x_j^k) \quad (3)$$

Inputs F1, F2, ..., Fn1 into the units $u_i^1$, where i = 1, 2, ..., n1, which units constitute the input layer, are fed into the units $u_i^1$, where i = 1, 2, ..., n1, without being weighted. The n1 number of signals F1, F2, ..., Fn1 are weighted with the weights of connections $W_{ij}^{k,k+1}$, and transmitted to the ultimate outputs $y_1^3$ and $y_2^3$. In this manner, outputs representing an optimum image point (i.e. the x coordinate and the y coordinate in the x-y rectangular coordinate system on the stimulable phosphor sheet) are obtained.

How the weights of connections $W_{ij}^{k,k+1}$ are determined will be described hereinbelow. First, initial values of the weights of connection $W_{ij}^{k,k+1}$ are given by random numbers. The range of the random numbers should preferably be limited such that, even when the values of the inputs F1, F2, ..., Fn1 fluctuate to the largest extent, the outputs $y_1^3$ and $y_2^3$ may take values falling within a predetermined range or values close to said predetermined range.

Thereafter, image signals are obtained in the same manner as that described above from a plurality of stimulable phosphor sheets storing radiation images whose optimum image points are known. Each of the image signals is then thinned out. In this manner, the n1 number of inputs F1, F2, ..., Fn1 are obtained. The n1 number of inputs F1, F2, ..., Fn1 are fed into the neural network shown in FIG. 3, and the outputs $y_i^k$ of the respective units $u_i^k$ are monitored.

After the outputs $y_i^k$ are obtained, square errors E1 and E2 between the ultimate outputs $y_1^3$, $y_2^3$ and the instructor signals representing a correct image point in the image (i.e. the signal $\tilde{y}_1^3$ representing the x coordinate of the image point and the signal $\tilde{y}_2^3$ representing the y coordinate of the image point) are calculated with the formulas $$E_1 = \tfrac{1}{2}(y_1^3 - \tilde{y}_1^3)^2 \tag{4}$$
$$E_2 = \tfrac{1}{2}(y_2^3 - \tilde{y}_2^3)^2 \tag{5}$$

The weights of connections $W_{ij}^{k\,k+1}$ are then corrected such that the square errors E1 and E2 become the smallest. The output $y_1^3$ will be described hereinbelow. The descriptions below also apply to the output $y_2^3$.

The square error E1 is a function of $W_{ij}^{k\,k+1}$. Therefore, in order for the square error E1 to be minimized, the weights of connection $W_{ij}^{k\,k+1}$ are corrected with the formula $$W_{ij}^{k\,k+1} = W_{ij}^{k\,k+1} - \eta \cdot \frac{\partial E_1}{\partial W_{ij}^{k\,k+1}} \tag{6}$$

where $\eta$ denotes a coefficient, which is referred to as a learning coefficient.

The following formula obtains:

$$\frac{\partial E_1}{\partial W_{ij}^{k\,k+1}} = \frac{\partial E_1}{\partial x_j^{k+1}} \cdot \frac{\partial x_j^{k+1}}{\partial W_{ij}^{k\,k+1}} \tag{7}$$

Also, Formula (2) gives $$x_j^{k+1} = \sum_i W_{ij}^{k\,k+1} \cdot y_i^k \tag{8}$$

Therefore, Formula (7) gives $$\frac{\partial E_1}{\partial W_{ij}^{k\,k+1}} = \frac{\partial E_1}{\partial x_j^{k+1}} \cdot y_i^k \tag{9}$$

From Formula (4), the following formula obtains:

$$\frac{\partial E_1}{\partial x_1^3} = (y_1^3 - \tilde{y}_1^3) \cdot \frac{\partial y_1^3}{\partial x_1^3} \tag{10}$$

Formula (10) can be changed with Formula (3) into $$\frac{\partial E_1}{\partial x_1^3} = (y_1^3 - \tilde{y}_1^3) \cdot f'(x_1^3) \tag{11}$$

From Formula (1), the following formula obtains:

$$f'(x) = f(x)(1 - f(x)) \tag{12}$$

Therefore, $$f'(x_1^3) = y_1^3 \cdot (1 - y_1^3) \tag{13}$$

Setting k=2 in Formula (9) and substituting Formulas (11) and (13) into Formula (9) yield $$\frac{\partial E_1}{\partial W_{i1}^{2\,3}} = \frac{\partial E_1}{\partial x_1^3} \cdot y_i^2 = (y_1^3 - \tilde{y}_1^3) \cdot y_1^3 \cdot (1 - y_1^3) \cdot y_i^2 \tag{14}$$

Substitution of Formula (14) into Formula (6) yields $$W_{i1}^{2\,3} = W_{i1}^{2\,3} - \eta \cdot (y_1^3 - \tilde{y}_1^3) \cdot y_1^3 \cdot (1 - y_1^3) \cdot y_i^2 \tag{15}$$

The weights of connections $W_{i1}^{2\,3}$, where i=1, 2, 3, are corrected with Formula (15).

Also, the following formula obtains:

$$\frac{\partial E_1}{\partial x_j^2} = \frac{\partial E_1}{\partial x_1^3} \cdot \frac{\partial x_1^3}{\partial x_j^2} \tag{16}$$

Substitution of Formulas (2) and (3) into Formula (16) yields $$\frac{\partial E_1}{\partial x_j^2} = \frac{\partial E_1}{\partial x_1^3} \cdot \frac{\partial}{\partial x_j^2}\left( \sum_j W_{j1}^{2\,3} \cdot y_j^2 \right) \tag{17}$$

$$= \frac{\partial E_1}{\partial x_1^3} \cdot W_{j1}^{2\,3} \cdot f'(x_j^2)$$

Formula (12) gives $$f'(x_j^2) = y_j^2 \cdot (1 - y_j^2) \tag{18}$$

Substitution of Formulas (11), (13), and (18) into Formula (17) yields $$\frac{\partial E_1}{\partial x_j^2} = (y_1^3 - \tilde{y}_1^3) \cdot y_1^3 \cdot (1 - y_1^3) \cdot y_j^2 \cdot (1 - y_j^2) \cdot W_{j1}^{2\,3} \tag{19}$$

Setting k=1 in Formula (9) and substituting Formulas (19) into Formula (9) yield $$\frac{\partial E_1}{\partial W_{ij}^{1\,2}} = \frac{\partial E_1}{\partial x_j^2} \cdot y_i^1 = (y_1^3 - \tilde{y}_1^3) \cdot y_1^3 \cdot (1 - y_1^3) \cdot \tag{20}$$

$$y_j^2 \cdot (1 - y_j^2) \cdot W_{j1}^{2\,3} \cdot y_i^1$$

Substitution of Formula (20) into Formula (6) and setting of k−1 yield $$W_{ij}^{1\,2} = W_{ij}^{1\,2} - \eta \cdot (y_1^3 - \tilde{y}_1^3) \cdot y_1^3 \cdot (1 - y_1^3) \cdot y_j^2 \cdot \tag{21}$$

$$(1 - y_j^2) \cdot y_i^1 \cdot W_{j1}^{2\,3}$$

The values of the weights of connections $W_{i1}^{2\,3}$, where i=1, 2, ..., n1, which have been corrected with Formula (15), are substituted into Formula (21). In this manner, the weights of connections $W_{ij}^{1\,2}$, where i=1, 2, ..., n1 and j=1, 2, ..., n2, are corrected.

Theoretically, the weights of connection $W_{ij}^{1\,k+1}$ can be converged to predetermined values by using Formulas (15) and (21), using a sufficiently small learning coefficient $\eta$ and carrying out the learning operations very many times. However, if a sufficiently small learning coefficient $\eta$ is used, the speed with which the learning operations are effected will become low. If a very large learning coefficient $\eta$ is used, "vibration" will occur in the learning operations (i.e. the weights of connections do not converge to predetermined values). Therefore, actually, the vibration is prevented by employing an inertia term, which is expressed in Formula (22), in the calculations of the correction amounts for the weights of connections, and the learning coefficient $\eta$ is set to a slightly large value.

$$\Delta W_{i j}^{k,k+1}(t+1) = \alpha \cdot \Delta W_{i j}^{k,k+1}(t) + \eta \cdot \frac{\partial E_1}{\partial x_j^{k+1}} \cdot y_i^k \quad (22)$$

where $\alpha$ denotes the coefficient referred to as the inertia term, and $\Delta W_{i j}^{k,k+1}(t)$ denotes the correction amount, which is used during the t'th learning operation and which is obtained by subtracting a weight of connection $W_{i j}^{k,k+1}$, which has not been corrected, from a weight of connection $W_{i j}^{k,k+1}$, which has been corrected. (Such an inertia term is described in, for example, "Learning internal representations by error propagation In Parallel Distributed Processing" by D. E. Rumelhart, G. E. Hinton and R. J. Williams, Volume 1, J. L. McClell and, D. E. Rumelhart and The PDP Research Group, MIT Press, 1986b.)

By way of example, the inertia term $\alpha$ is set to 0.9, the learning coefficient $\eta$ is set to 0.25, and 200,000 times of corrections (learning operations) are carried out for each of the weights of connections $W_{i j}^{k,k+1}$. Thereafter, each of the weights of connection $W_{i j}^{k,k+1}$ is fixed at a final value. At the time at which the learning operations are completed, the two outputs $y_1^3$ and $y_2^3$ accurately represent the x coordinate and the y coordinate of the image point.

In the manner described above, an optimum image point in the object image can be determined by using the neural network.

The number of layers of the neural network is not limited to three. Also, no limitation is imposed on the number of the units of each layer. The number of the units of each layer may be determined in accordance with the number of the picture elements represented by the image signal SP, which is fed into the neural network, the accuracy, with which the image point is to be determined, or the like.

By carrying out the aforesaid learning operation for each image recording menu, a neural network which is optimum for the image recording menu can be selected, and an image point appropriate for the image recording menu can be determined with the selected neural network. For example, when the learning operation is carried out only for an image recording menu concerning an image of lumbar vertebrae, the neural network learns how to determine an image point appropriate for an image of lumbar vertebrae. Therefore, when this neural network is selected for an image of lumbar vertebrae, an image point appropriate for the image of lumbar vertebrae can be determined.

The image point located in the object image is determined by the neural network in the manner described above. Thereafter, along each of a plurality of radial lines, each of which extends from the determined image point to an edge of the stimulable phosphor sheet 11, an image processing means 29 detects a contour point, which is considered to be present on a contour of the irradiation field on the stimulable phosphor sheet 11. The contour point is detected from the image signal components of the image signal SP representing the picture elements corresponding to positions located along each line. The image processing means 29 then detects the region surrounded by the lines, which connect the contour points thus detected, as the irradiation field. After finding the shape and location of the irradiation field, the image processing means 29 carries out appropriate image processing on the image signal SP corresponding to the region inside of the irradiation field.

The image signal SP, which has been obtained from the image processing, is fed into a reproducing means 30. The reproducing means 30 reproduces a visible radiation image from the image signal SP.

In the aforesaid embodiment, the determined image point in the object image is utilized to determine the shape and location of the irradiation field. However, the determined image point in the object image may be utilized for various other purposes. For example, when an object image was recorded at the peripheral part of the stimulable phosphor sheet 11, a visible image may be reproduced by the reproducing means 30 shown in FIG. 2 such that the object image may be located at the center part of the visible image. For this purpose, the image point in the object image determined by the computer system 40 can be utilized.

In the aforesaid embodiment, no preliminary readout is carried out. However, the method for determining an image point in an object image in accordance with the present invention is also applicable when a preliminary readout is carried out for obtaining a preliminary read-out image signal, the shape and location of an irradiation field are detected from the preliminary read-out image signal, and the read-out conditions for the final read out are set on the basis of the preliminary read-out image signal corresponding to the region inside of the irradiation field.

Also, in the aforesaid embodiment, an image stored on a stimulable phosphor sheet is read out. However, the present invention is not limited to the aforesaid embodiment wherein a stimulable phosphor sheet is used, and is also applicable when an image point located in an object image is determined from an image signal, which has been detected with an appropriate technique from an image, such as a medical image, which has been recorded on conventional X-ray film. The method for determining an image point in an object image in accordance with the present invention is widely applicable when an image signal is obtained by detecting light information representing a radiation image of an object recorded on a recording medium, and a visible radiation image is reproduced from the image signal.

What is claimed is:

1. A method for determining an image point in an object image, wherein an image point located in a region inside of the object image is determined from an image signal made up of a series of image signal components representing respective picture elements in a radiation image, which includes the object image and which has been recorded on a recording medium in accordance with a predetermined image recording menu, the method comprising the steps of:
i) preparing a plurality of different neural networks for a plurality of different image recording menus, each of said neural networks receiving an image signal and generating outputs which represent the image point,
ii) selecting a neural network, which is optimum for said predetermined image recording menu, from the plurality of said neural networks, and iii) obtaining outputs, which represent said image point located in the region inside of said object image, from the selected neural network.

2. A method as defined in claim 1 wherein each of the plurality of said image recording menus includes at least one of what mode is used when the radiation image is recorded, what portion of an object is represented by a recorded radiation image, and what image recording apparatus is used when a radiation image is recorded.

3. A method as defined in claim 1 wherein said neural network, which is optimum for said predetermined image recording menu, is selected automatically.

4. A method as defined in claim 1 wherein said recording medium is a stimulable phosphor sheet on which a radiation image has been stored.

5. A method as defined in claim 4 wherein said image signal is obtained by exposing said stimulable phosphor sheet to stimulating rays, which cause said stimulable phosphor sheet to emit light in proportion to the amount of energy stored thereon during said exposure to radiation, and photoelectrically detecting the emitted light.

6. A method as defined in claim 5 wherein said image signal is obtained from a preliminary read-out operation which is carried out in order approximately to ascertain the radiation image stored on said stimulable phosphor sheet.

7. A method as defined in claim 5 wherein said stimulating rays are a laser beam.

8. A method as defined in claim 1 wherein said recording medium is photographic film.

* * * * *